United States Patent [19]

Serini et al.

[11] Patent Number: 5,126,495

[45] Date of Patent: Jun. 30, 1992

[54] THERMOPLASTIC POLYESTER CARBONATE-POLYSILOXANE BLOCK COPOLYMERS

[75] Inventors: Volker Serini, Krefeld; Dietrich Rathmann, Leverkusen; Leo Morbitzer, Koeln; Dieter Freitag, Krefeld; Ulrich Grigo, Kempen, all of Fed. Rep. of Germany

[73] Assignee: Bayer Aktiengesellschaft, Leverkusen, Fed. Rep. of Germany

[21] Appl. No.: 721,727

[22] Filed: Jun. 26, 1991

Related U.S. Application Data

[63] Continuation of Ser. No. 575,268, Aug. 30, 1990, abandoned.

[30] Foreign Application Priority Data

Sep. 5, 1989 [DE] Fed. Rep. of Germany ....... 3929401

[51] Int. Cl.⁵ .............................................. C08G 77/06
[52] U.S. Cl. ........................................ 528/21; 528/26; 528/29; 528/23; 528/25
[58] Field of Search ........................ 528/26, 29, 21, 23, 528/25

[56] References Cited

U.S. PATENT DOCUMENTS

| | | | |
|---|---|---|---|
| 3,379,790 | 4/1968 | Krauss et al. | 260/824 |
| 3,994,988 | 11/1976 | Laurin | 260/824 R |
| 4,681,922 | 7/1987 | Schmidt et al. | 528/26 |
| 4,894,427 | 1/1990 | Yamamoto et al. | 528/21 |
| 5,032,661 | 7/1991 | Serini et al. | 528/29 |

FOREIGN PATENT DOCUMENTS 073067 3/1983 European Pat. Off. .
149789 7/1985 European Pat. Off. .
368104 5/1990 European Pat. Off. .

Primary Examiner—John C. Bleutge
Attorney, Agent, or Firm—Joseph C. Gil; Aron Preis

[57] ABSTRACT

The new polyester carbonate-polysiloxane block copolymers having recurrent structural units of the following formulae

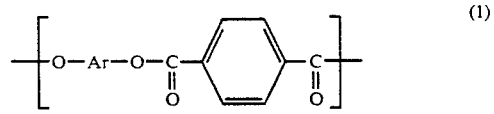 (1)

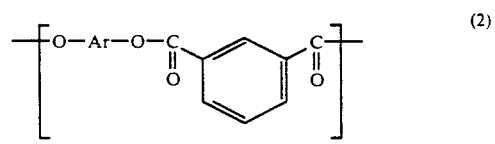

(2)

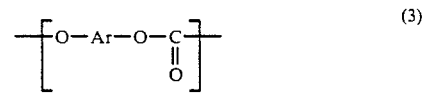

(3)

and

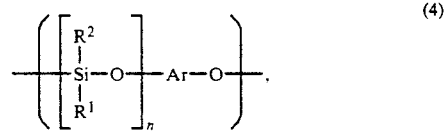 (4)

have improved resistance to petrol compared with known polyester carbonate-polysiloxane block copolymers. They are used for the manufacture of moulded products, in particular those used under the engine bonnet of a motor vehicle or as external parts of motor vehicles.

4 Claims, No Drawings

THERMOPLASTIC POLYESTER CARBONATE-POLYSILOXANE BLOCK COPOLYMERS

This application is a continuation of application Ser. No. 07/575,268 filed Aug. 30, 1990 and now abandoned.

This invention relates to new thermoplastic polyester carbonate-polysiloxane block copolymers with improved resistance to petrol and to their use for the manufacture of moulded products.

Siloxane-polyester carbonate block copolymers which have good technical heat resistance and better thermoplastic processing properties than unmodified aromatic polyester carbonates are disclosed in DE-OS 33 44 911.

Polyester carbonate-polysiloxane block copolymers containing 45 to 60% by weight of polysiloxane blocks are described in DE-OS 26 40 241. These polymers, however, do not have a satisfactory level of technical heat resistance.

This invention relates to polyester carbonate-polysiloxane block copolymers containing recurrent structural units of the following formulae:

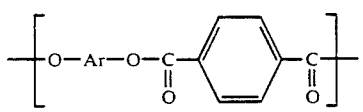
(1)

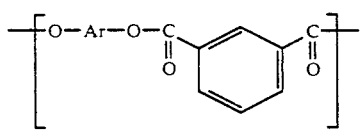
(2)

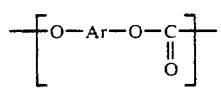
(3)

and

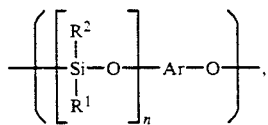
(4)

wherein $R^1$ and $R^2$ may be identical or different and stand for optionally halogen-substituted $C_1$–$C_{20}$-alkyl, $C_2$–$C_6$-alkenyl, $C_6$–$C_{14}$-aryl, $C_7$–$C_{15}$-aralkyl or $C_7$–$C_{15}$-alkaryl and each

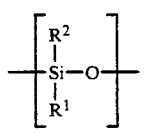

unit may carry different substituents denoted by $R^1$ and $R^2$,

Ar denotes a mononuclear or polynuclear aromatic group having 6 to 30 carbon atoms and n stands for an integer with a value from 5 to 200, and the structural units (1) and (2) amount to 5 to 98% by weight of the sum of the structural units (1), (2) and (3) while the structural units (4) amount to 0.1 to 40% by weight of the sum of the structural units (1), (2), (3) and (4), characterised in that the structural units (2) amount to 75 to 100% by weight of the sum of the structural units of (1) and (2).

The lower limit of n is preferably 10, more preferably 20 or still more preferably 30 and especially 40. The upper limit of n is preferably 150, more preferably 100, even more preferably 80 and especially 45.

The lower limit of the sum of structural units (1) and (2) preferably amounts to 10% by weight, more preferably 20% by weight, even more preferably 45% by weight and especially 70% by weight of the sum of the structural units (1), (2) and (3). The upper limit to the sum of structural units (1) and (2) is preferably 95% by weight, more preferably 90% by weight and most preferably 85% by weight of the sum of the structural units (1), (2) and (3).

The structural units (4) preferably amount to 0.3 to 30% by weight, more preferably 0.6 to 15% by weight, even more preferably 1 to 8% by weight and especially 2 to 7% by weight of the sum of the structural units (1), (2), (3) and (4).

The lower limit to the structural units (2) preferably amounts to 80% by weight, more preferably 85% by weight, of the sum of the structural units (1) and (2). The upper limit to the structural units of formula (2) is preferably 95% by weight, more preferably 90% by weight of the sum of the structural units (1) and (2).

The groups Ar in the recurrent structural units mentioned above may be groups on which aromatic dihydroxy compounds are based, such as hydroquinone, resorcinol, dihydroxydiphenyls, bis-(hydroxyphenyl)-alkanes, bis-(hydroxyphenyl)-cycloalkanes, bis-(hydroxyphenyl)-sulphides, bis-(hydroxyphenyl)-ethers, bis-(hydroxyphenyl)-ketones, bis-(hydroxyphenyl)-sulphones, α,α'-bis-(hydroxphenyl)-isopropylbenzenes, pentamethyl-(hydroxyphenyl)-indanols and corresponding compounds which are substituted in the nucleus. These and other suitable aromatic dihydroxy compounds are described, for example, in the monograph by H. Schnell, Chemistry and Physics of Polycarbonates, Polymer Reviews 9, Interscience Publishers, New York 1964; in the publication by V. Serini, D. Freitag and H. Vernaleken, Polycarbonate aus o,o,o',o'-tetramethyl-substituierten Bisphenolen, Angewandte Makromolekulare Chemie 55 (1976), 175 to 189, and in U.S. Pat. Nos. 3,028,365; 2,999,835; 3,148,172; 3,271,368; 2,991,273; 3,271,367; 3,780,078; 3,014,891; and 2,999,846; in DT-OS 1 570 703, 2 063 050; 2 063 052, 2 211 957, 2 402 175, 2 402 176 and 2 402 177 and in FR-PS 1 561 518.

The following aromatic dihydroxy compounds are mentioned as preferred compounds: Hydroquinone, bis-(4-hydroxyphenyl), 2,2-bis-(4-hydroxyphenyl)-propane, bis-(4-hydroxyphenyl)-sulphide, bis-(4-hydroxyphenyl)-ether, bis-(4-hydroxyphenyl)-ketone, bis-(4-hydroxyphenyl)-sulphone, bis-(4-hydroxyphenyl)-methane, 1,1-bis-(4-hydroxyphenyl)-cyclohexane, α,α'-bis-(4-hydroxyphenyl)-p-diisopropylbenzene, 1,1-bis-(4-hydroxyphenyl)-1-phenyl-ethane, 2,2-bis-(3-methyl-4-hydroxyphenyl)-propane, 2,2-bis-(3,5-dichloro-4-hydroxyphenyl)-propane, 2,2-bis-(3,5-dibromo-4-hydroxyphenyl)-propane, 2,2-bis-(3,5-dimethyl-4-hydroxyphenyl)-propane, bis-(3,5-dimethyl-4-hydroxyphenyl)-methane, 2,2-bis-(3,5-dimethyl-4-hydroxyphenyl)-butane and bis-(3,5-dimethyl-4-hydroxyphenyl).

The following are particularly preferred: Bis-(4-hydroxyphenyl), 2,2-bis-(4-hydroxyphenyl)-propane and 2,2-bis-(3,5-dimethyl-4-hydroxyphenyl)-propane, 2,2-bis-(4-hydroxyphenyl)-propane being the most preferred of these compounds.

The following are preferred groups $R^1$ and $R^2$: $C_1$–$C_6$-alkyl, $C_2$–$C_8$-alkenyl, $C_6$–$C_{10}$-aryl, $C_7$–$C_{12}$-aralkyl and $C_7$–$C_{12}$-alkaryl. These groups may be partly or completely substituted by a halogen such as fluorine, chlorine or bromine, preferably fluorine or chlorine, most preferably fluorine. The following are specific examples of preferred groups $R^1$ and $R^2$: Methyl, ethyl, propyl, n-butyl, tert.-butyl, vinyl, phenyl, naphthyl, chloromethyl, 3,3,3-trifluoropropyl, perfluorobutyl and perfluorooctyl. Methyl and phenyl are particularly preferred, especially methyl.

The polyester carbonate-polysiloxane block copolymers according to the invention may be prepared by processes known from the literature for the preparation of polyester carbonates, e.g. the solvent-free transesterification process, processes carried out in homogeneous solution, and diphasic interface processes. Diphasic interface processes are preferably employed (see EP 0 036 080, V. V. Korshak and S. V. Vinograda, Polyesters, Pergamon Press, 1965, page 448).

The starting components used for the preparation of the polyester carbonate-polysiloxane block copolymers according to the invention by the diphasic interface process are preferably aromatic dihydroxy compounds, terephthalic acid dichloride and/or isophthalic acid dichloride, phosgene and polydiorganosiloxanes containing hydroxyaryloxy end groups. The polydiorganosiloxanes may be used as a mixture of polydiorganosiloxanes carrying differing substituents. Such polydiorganosiloxanes carrying hydroxyaryloxy end groups are described, for example, in DE-OS 33 34 782.

Terephthalic acid and isophthalic acid may also be used in the diphasic interface process, in which case dicarboxylic acid chlorides or dichlorides are formed as intermediate products with the aid of phosgene. Polydiorganosiloxanes carrying

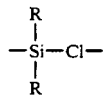

end groups may also be used. Bis-chlorocarbonic acid esters of aromatic dihydroxy compounds are also suitable.

Instead of terephthalic acid and/or isophthalic acid, the polyester carbonate-polysiloxane copolymers according to the invention may contain up to 30 mol-% of other dicarboxylic acids incorporated by cocondensation, in particular aromatic dicarboxylic acids such as tert.-butylisophthalic acid, 3,3'-diphenyldicarboxylic acid, 4,4'-diphenyldicarboxylic acid, 4,4'-benzophenone dicarboxylic acid, 3,4'-benzophenone dicarboxylic acid, 4,4'-diphenylether dicarboxylic acid, 4,4'-diphenylsulphone dicarboxylic acid, 2,2-bis-(4-carboxyphenyl)-propane, trimethyl-3-phenylindan-4',5-dicarboxylic acid or naphthalene dicarboxylic acid, the percentage being based on the sum of dicarboxylic acids. The polyester carbonate-polysiloxane copolymers according to the invention may also contain up to 40 mol-% of hydroxy carboxylic acids incorporated by condensation, in particular aromatic hydroxy carboxylic acids such as p-hydroxybenzoic acid or hydroxynaphthoic acids, the percentage being based on the sum of the aromatic dicarboxylic acids.

The polyester carbonate-polysiloxane block copolymers according to the invention may be mixed in the usual manner with at least one polymer selected from aromatic polyester carbonates, aromatic polyesters and aromatic polycarbonates. The proportion of the above-mentioned polymers added to the block copolymers according to the invention is preferably not sufficient to bring about a significant change in the properties of the thermoplastic polyester carbonate-polysiloxane block copolymers according to the invention. The proportion of added polymers normally amounts to about 97 to 1% by weight, preferably 90 to 1% by weight, based on the total mixture. The proportion of the above-mentioned polymers is preferably calculated so that the sum of the units (1), the sum of the units (2), the sum of the units (3) and the sum of the units (4) in the mixtures are below the limits according to the invention of the polyestercarbonate-polysiloxane block copolymers.

The polycondensation is carried out by the two-phase interface process in a diphasic system of aqueous alkali metal solution and an organic solvent which is immiscible with water. Polycondensation is generally carried out with the aid of a catalyst and may be carried out in the presence of chain terminators, branching agents and anti-oxidants.

Examples of suitable water immiscible organic solvents include chlorinated hydrocarbons such as chloroform, dichloroethane, tri- and tetrachloroethylene, tetrachloroethane, dichloromethane, chlorobenzene and dichlorobenzene but not chlorinated hydrocarbons such as toluene and xylene. Chlorobenzene, dichloromethane or mixtures of the two are preferably used.

The chain terminators used are compounds of the type known for polycarbonates, polyesters and polyester carbonates, e.g. secondary amines, phenols or acid chlorides. Phenols are preferred, for example, phenol and alkylphenols preferably containing $C_1$–$C_{12}$-alkyl groups, such as p-tert.-butylphenol, m- and p-3,5-dimethyl-heptyl-phenol and m- and p-1,1,3,3-tetramethylbutylphenol, hydroxydiphenyl and p-cumylphenol. It is particularly preferred to use p-1,1,3,3-tetramethylbutylphenol (p-isooctylphenol).

The branching agents used may be compounds which are at least trifunctional. Branching agents of this type are known (see EP 00 36 080, DE-OS 35 06 472 and DE-OS 26 15 038) and are generally used in quantities of about 0.01 to 3 mol-%, based on the quantity of aromatic dihydroxy compound used for the process.

The catalysts used may be tertiary amines or phase transfer catalysts such as quanternary ammonium and phosphonium compounds or crown ethers. The following are examples of preferred catalysts: N-Ethylpiperidine, tetrabutyl ammonium bromide and/or triphenylbenzyl phosphonium bromide.

The polyester carbonate-polysiloxane block copolymers according to the invention generally have relative viscosities ($\eta_{rel}$) of about 1.10 to 5.0, preferably from 1.15 to 3.0, more preferably from 1.18 to 1.60, most preferably from 1.20 to 1.50 and especially from 1.24 to 1.40, determined in dichloromethane or in phenol/o-dichlorobenzene (1/1 parts by weight) at c=5 g/l and 25° C.

The polyester carbonate-polysiloxane block copolymers according to the invention can be worked up into moulded products which combine great toughness with high resistance to petrol. The polyester carbonate-polysiloxane block copolymers according to the invention are particularly suitable for parts which are required to be tough and petrol resistant (parts of motor vehicles under the bonnet and external parts of motor vehicles).

The polyester carbonate-polysiloxane block copolymers according to the invention may contain dyes, pigments, mould release agents, antistatic agents, conductivity additives, stabilizers such as UV stabilizers and oxidation stabilizers, flame retardants, fillers and reinforcing materials and other auxiliary substances in the usual quantities.

Specific examples of such additives include graphite, carbon black, metal fibres, metal powders, kieselguhr, quartz, kaolin, mica, clay, $CaF_2$, $CaCO_3$, aluminium oxides, aluminium nitride, silicates, barium sulphate, glass fibres, carbon fibres, ceramic fibres and inorganic and organic pigments and, as mould release agents, esters of polyhydric alcohols with long chain carboxylic acids such as glycerol stearate, pentaerythritol stearate and trimethylolpropane tristearate.

The polyester carbonate-polysiloxane block copolymers according to the invention have a higher resistance to petrol than the block copolymers described in DE-OS 33 44 911.

The block copolymers according to the invention have greater rigidity than the polyester carbonate-polysiloxane block copolymers according to DE-OS 26 40 241.

EXAMPLE 1

Polyester carbonate-polysiloxane block copolymer containing 5% by weight of polysiloxane blocks, polyester content amounting to 90% by weight of the polyester carbonate content, isophthalate content amounting to 80% by weight of the polyester content (APESI 90 I 80/Si 5)

840 g of NaOH (21 mol) and 2283 g of bisphenol A (10 mol) were dissolved in 100 kg of distilled water. To this solution were added 85 kg of methylene chloride in which 71 g of p-isooctylphenol (0.32 mol) and 181 g of a polydimethylsiloxane having an average degree of polycondensation $\overline{P}_n = 65$ and containing bisphenol A end groups (0.0357 mol) were dissolved. 351 g of terephthalic acid dichloride (1.73 mol) and 1407 g of isophthalic acid dichloride (6.93 mol) dissolved in 10 kg of methylene chloride were added with stirring at a temperature of 25° C. Stirring was then continued for 30 minutes at 25° C. 1840 g of NaOH (46 mol) dissolved in 8 kg of distilled water were then added and 495 g of phosgene (5 mol) were added at a uniform rate over a period of 30 minutes at 25° C. Stirring was then continued for 30 minutes at 25° C.

The polyester carbonate-polysiloxane block copolymer obtained was worked up by separating the organic phase from the diphasic mixture and washing it with dilute aqueous NaOH, dilute aqueous $H_3PO_4$ and distilled water until the wash waters were free from electrolytes. The polyester carbonate-polysiloxane block copolymer was then evaporated in a tank to the extent of forming a concentrated solution after the addition of chlorobenzene to the methylene chloride solution, and the polyester carbonate-polysiloxane block copolymer was then isolated from this concentrated solution as a granulate by evaporation extrusion. The relative viscosity of the granulate was $\eta_{rel} = 1.288$ determined in $CH_2Cl_2$ at 25° C., c=5 g/l. This granulate was then worked up into test samples by extrusion injection moulding. The results of testing the resistance to petrol on these test samples are entered in the following Table.

EXAMPLE 2

Polyester carbonate-polysiloxane block copolymer containing 5% by weight of polysiloxane blocks, polyester content amounting to 80% by weight of the polyester carbonate content, isophthalate content amounting to 85% by weight of the polyester content (APESI 80 I 85/Si 5)

The APESI 80 I 85/Si 5 was prepared as in Example 1 but with the quantities of reactants altered to conform to the polymer composition. The relative viscosity of the granulate was $\eta_{rel} = 1.295$ determined as in Example 1. The test samples and tests were as in Example 1 (see Table).

EXAMPLE 3

Polyester carbonate-polysiloxane block copolymer containing 5% by weight of polysiloxane blocks, polyester content amounting to 70% by weight of the polyester carbonate content, isophthalate content amounting to 90% by weight of polyester content (APESI 70 I 90/Si 5)

The APESI 70 I 90/Si 5 was prepared as in Example 1 but with the quantities of reactants altered according to the polymer composition. The relative viscosity of the granulate was $\eta_{rel} = 1.293$ determined as in Example 1. Test samples and tests as in Example 1 (see Table).

EXAMPLE 4 (COMPARISON)

Polyester carbonate-polysiloxane block copolymer containing 5% by weight of polysiloxane blocks, polyester content amounting to 90% by weight of the polyester carbonate, isophthalate content amounting to 50% by weight of the polyester content (APESI 90 I 50/Si 5).

The APESI 90 I 50/Si 5 was prepared in the same manner as the APESI 90 I 90/Si 5 in Example 1 but with the quantities of reactant altered according to the polymer composition. The relative viscosity of the granulate was $\eta_{rel} = 1.290$, determined as in Example 1. Test samples and tests as in Example 1 (see Table).

EXAMPLE 5 (COMPARISON)

Polyester carbonate-polysiloxane block copolymer containing 5% by weight of polysiloxane blocks, polyester content amounting to 80% by weight of the polyester carbonate, isophthalate content amounting to 50% by weight of the polyester content (APESI 80 I 50/Si 5).

The APESI 80 I 50/Si 5 was prepared in the same manner as the APESI 80 J 85/Si 5 in Example 2 but with the quantities of reactants altered according to the polymer composition. The relative viscosity of the granulate was $\eta_{rel} = 1.296$, determined as in Example 1. Test samples and tests as in Example 1 (see Table).

EXAMPLE 6 (COMPARISON)

Polyester carbonate-polysiloxane block copolymer containing 5% by weight of polysiloxane blocks, polyester content amounting to 70% by weight of the polyester carbonate, isophthalate content amounting to 50% by weight of the polyester content (APESI 70 I 50/Si 5).

The APESI 70 I 50/Si 5 was prepared in the same manner as the APESI 70 I 90/Si 5 in Example 3 but with the quantities of reactants altered according to the polymer composition. The relative viscosity of the granulate was $\eta_{rel}$=1.290, determined as in Example 1. Test samples and tests as in Example 1.

TABLE TO EXAMPLES 1-6

Resistance to petrol of polyester carbonate-polysiloxane block copolymers (APESI)

The test samples measuring 80×10×4 (in mm) produced from the granulates of Examples 1-6 were kept for 2 minutes in a toluene/isooctane mixture (1/1 parts by weight) (petrol simulator) at 25° C. with an edge fibre elongation of 3% and then subjected to a tension test.

For comparison, the similar but untreated test samples were subjected to the same tension test. The tensile strengths $\sigma$ determined in the tension tests of test samples which had been kept in the toluene/isooctane mixture were compared with the tensile strengths $\sigma_0$ of the untreated test samples (initial values). The higher the $\sigma/\sigma_0$ ratio obtained for an APESI, the greater is the petrol resistance.

It was surprising to find that the APESI types of Examples 1-3 according to the invention had substantially higher petrol resistances than the APESI types of Examples 4-6 used for comparison (APESI types according to DE-OS 33 44 911).

| Example No. | Polymer type | $\frac{\sigma}{\sigma_0}$ (%) |
|---|---|---|
| 1 | APESI 90 I 80/Si 5 | 88 |
| 2 | APESI 80 I 85/Si 5 | 90 |
| 3 | APESI 70 I 90/Si 5 | 75 |
| 4 (Comparison) | APESI 90 I 50/Si 5 | 8 |
| 5 (Comparison) | APESI 80 I 50/Si 5 | 6 |
| 6 (Comparison) | APESI 70 I 50/Si 5 | 6 |

We claim:

1. Polyester carbonate-polysiloxane block copolymers having the following recurrent structural units

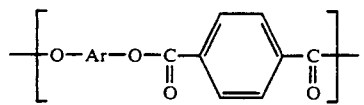

(1)

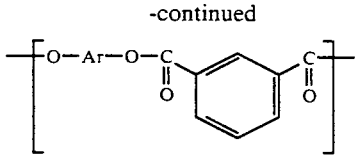

(2)

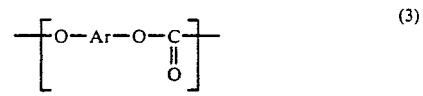

(3)

and

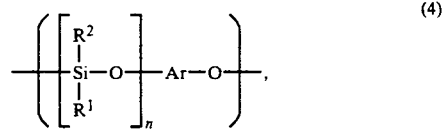

(4)

wherein
R$^1$ and R$^2$ are identical or different and stand for optionally halogen-substituted C$_1$-C$_{20}$-alkyl, C$_2$-C$_6$-alkenyl, C$_6$-C$_{14}$-aryl, C$_7$-C$_{15}$-aralkyl or C$_7$-C$_{15}$-alkaryl and each

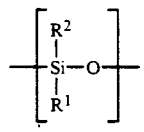

unit may carry different substituents denoted by R$^1$ and R$^2$,

Ar denotes a mononuclear or polynuclear aromatic group having 6 to 30 carbon atoms and n denotes an integer with a value from 5 to 200 and the structural units (1) and (2) amount to 5 to 98% by weight of the sum of the structural units (1), (2) and (3) while the structural units (4) amount to 0.1 to 40% by weight of the sum of the structural units (1), (2), (3) and (4), characterised in that the structural units (2) amount to 75 to 100% by weight of the sum of the structural units (1) and (2).

2. A molded article comprising the copolymer of claim 1.

3. The polyester carbonate-polysiloxane block copolymers of claim 1 which are further characterized in their improved gasoline resistance.

4. The polyester carbonate-polysiloxane block copolymers of claim 1 which are further characterized in that their resistance to gasoline environment is greater than the corresponding resistance of copolymers where the structural units (2) do not amount to 75 to 100% by weight of the sum of the structural units (1) and (2).

* * * * *